United States Patent Office 3,281,385
Patented Oct. 25, 1966

3,281,385
COATING COMPOSITIONS OF GRAFT COPOLYMERS OF AMMONIUM SALTS OF UNSATURATED ALIPHATIC CARBOXYLIC ACIDS AND BUTADIENE-STYRENE COPOLYMERS AND METHOD OF MAKING THE SAME
John Berten Gardner and Billy Gene Harper, Lake Jackson, Tex., assignors to The Dow Chemical Company, Midland, Mich., a corporation of Delaware
No Drawing. Filed Dec. 21, 1960, Ser. No. 77,297
9 Claims. (Cl. 260—29.7)

This invention concerns new coating compositions comprising aqueous dispersions of graft copolymers of ammonium salts of ethylenically unsaturated aliphatic carboxylic acids and butadiene-styrene copolymers and pertains to a method of making the same. It relates more particularly to coating compositions comprising aqueous dispersions of graft copolymers of ammonium salts of aliphatic carboxylic acids having the general formula

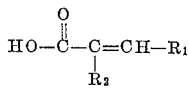

wherein $R_1$ and $R_2$ each represents a member of the group consisting of hydrogen and alkyl radicals containing from 1 to 2 carbon atoms and a latex of a previously prepared copolymer of butadiene and styrene, and pertains to a method of making the coating compositions.

The coating compositions of the invention, when applied to the surfaces of metals, dry to form continuous films possessing good adherence and which are highly resistant to corrosion, impact and penetration of water. They are particularly useful as primer coatings for metals, e.g. iron or steel.

It has now been discovered that coating compositions capable of drying to produce continuous films possessing good adherence to metals, high resistance to penetration by water and good impact strength as well as being highly resistant to corrosion and protective of the coated metal can readily be prepared by forming an aqueous dispersion of a graft copolymer by polymerizing a minor proportion of an ammonium salt of an aliphatic carboxylic acid having the general formula

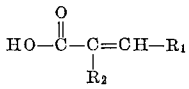

wherein $R_1$ and $R_2$ each represents a radical selected from the group consisting of hydrogen and alkyl radicals containing from 1 to 2 carbon atoms, with a predominant amount of a latex of a previously prepared copolymer of styrene and butadiene. Examples of suitable ammonium salts of suitable unsaturated carboxylic acids to be employed in the invention are the ammonium salt of acrylic acid, methacrylic acid, crotonic acid, isocrotonic acid, angelic acid, senecioic acid and alpha-ethyl acrylic acid.

The coating compositions are aqueous dispersions of graft copolymers of the ammonium salts of the aliphatic carboxylic acids and the base copolymer of butadiene and styrene in latex form and can contain from about 0.2 to 10, preferably from about 2 to about 8, percent by weight of the ammonium salt of the unsaturated aliphatic carboxylic acid, graft copolymerized onto the base copolymer of butadiene and styrene and correspondingly they contain from about 99.8 to 90, preferably from about 98 to about 92 percent by weight of said base copolymer.

Among the copolymers of styrene and butadiene which can be employed as starting materials, are copolymers of from about 20 to 75 percent by weight of butadiene and from 80 to 25 percent by weight of styrene. Methods of making synthetic latexes of such copolymers by polymerizing a mixture of the monomers in an aqueous emulsion are well known.

In brief, a synthetic latex is prepared by admixing butadiene and styrene in the desired proportions with an aqueous solution consisting of, for example, 99.62 percent by weight of water, 0.13 percent of Aquarex D (the sodium sulfate esters of a mixture of higher alcohols, principally lauryl and myristyl alcohols) as emulsifying agent, 0.09 percent of sodium bicarbonate and 0.16 percent of potassium persulfate as polymerization catalyst, in a closed pressure resistant vessel and heating the mixture at a temperature of 80–95° C. with agitation. The copolymer latex starting material preferably contains at least 20 percent by weight or more, e.g. from 20 to 50 percent by weight, of the copolymer of butadiene and styrene. The latex starting material should have a neutral to alkaline pH value, or if acidic, is preferably adjusted to a neutral to alkaline pH value, e.g. to a pH of from 7 to 10, by addition of an alkali such as ammonia, ammonium hydroxide, or sodium or potassium hydroxide prior to employing the latex for making the graft copolymer dispersions of the invention.

The ammonium salt of the unsaturated aliphatic carboxylic acid can be prepared by reaction of ammonium or ammonium hydroxide, with the acid.

The coating compositions, comprising aqueous colloidal dispersions of the graft copolymer containing from 25 to 50 percent by weight or more of graft copolymer, can readily be prepared by subjecting the synthetic latex of the base copolymer of butadiene and styrene starting material containing from 20 to 50 percent by weight of the copolymer to high energy ionizing radiation such as gamma rays, high speed electrons, X-rays or radiation from atomic piles or reactors, in a field having an intensity of at least 40,000 rads per hour and for a total dose of from 1 to 10 megarads to provide active sites along the polymer chains at which the grafting will occur. Thereafter, the irradiated latex is admixed with the ammonium salt of one or more of the unsaturated aliphatic carboxylic acids, e.g. ammonium acrylate, in the desired proportions and the graft copolymerization is allowed to proceed until the polymerization of the monomers is complete or substantially complete. The polymerization can readily be carried out at room temperature or thereabout, but higher or lower temperatures can be used. The polymerization is usually complete in from 5 to 10 hours or less at room temperature. The process can be carried out batchwise or in continuous manner. For example, the latex of the copolymer of styrene and butadiene can be flowed continuously as a stream under a beam of high speed electrons from a General Electric Resonant Transformer, thereby subjecting it to the desired dosage of radiation to produce active sites along the polymer chains, then mixed with the ammonium salt of the monomeric aliphatic carboxylic acid in the desired proportions, thence through a polymerization zone to produce the graft copolymer composition. Alternatively, the ammonium salt of the acid can be mixed with the latex and the mixture thereafter subjected to high energy ionizing radiation to effect the graft copolymerization.

In an alternate procedure, the latex of the copolymer of styrene and butadiene starting material can be admixed with the ammonium salt of the carboxylic acid in the desired proportions, and a usual peroxygen polymerization catalyst, such as sodium persulfate, potassium persulfate, ammonium persulfate, lauroyl peroxide, acetyl peroxide, benzoyl peroxide, and the like added, then by heating the resulting mixture at temperatures between about 60° and 95° C., to graft copolymerize the monomeric carboxylic acid salt with the base copolymer.

Additives such as stabilizers, antioxidants, plasticizers, thickening agents, pigments, dyes, etc., can be incorporated with the aqueous colloidal dispersions of the graft copolymer compositions if desired.

In a preferred embodiment of the invention the coating compositions comprise the aqueous colloidal dispersions of the graft copolymer in admixture with an iron oxide pigment such as red iron oxide or yellow iron oxide. Such pigmented compositions are particularly useful as primer coatings for metals or metal articles such as automobile bodies, structural steel or sheet steel buildings.

The following examples illustrate ways in which the principle of the invention has been applied but are not to be construed as limiting its scope.

*Example 1.*—A synthetic latex containing approximately 45 percent by weight of a copolymer of 60 percent by weight of styrene and 40 percent of butadiene, prepared by polymerizing a mixture of the monomers in an aqueous emulsion, i.e. in admixture with an aqueous solution consisting of approximately 99.62 percent of water, 0.16 percent of potassium persulfate, 0.13 percent of Aquarex D (the sodium salts of sulfate monoesters of a mixture of higher fatty alcohols, chiefly lauryl and myristyl derivatives of the type $RSO_4Na$), and 0.09 percent of sodium carbonate, at a temperature of 95° C., was subjected to high speed electrons from a General Electric Resonant Transformer operating at a beam current of 1 milliampere and 1 m.e.v. potential for a total dose of 1.8 megarads. A weighted portion of the irradiated copolymer latex was mixed with an aqueous 10 weight percent solution of ammonium acrylate in amounts corresponding to 4 percent by weight of the copolymer. The resulting mixture was heated at a temperature of 50° C. for a period of 2 hours to graft copolymerize the ammonium acrylate monomer. A portion of the graft copolymer latex was spread as a layer 1.5 mils thick on a clean glass plate and was dried to form a film. A spot of water was placed on the film and allowed to stand at room temperature. The time of standing before occurrence of a white spot beneath the water was observed. The film was resistant to the water for a period of about 3 minutes. In contrast, a film prepared from the ungrafted copolymer latex and tested in the same manner showed a white spot in less than one minute after contact with the spot of water.

*Example 2.*—In each of a series of experiments, a weighed portion of the synthetic latex of a copolymer of 60 percent by weight of styrene and 40 percent of butadiene, prepared in part A above was subjected to a beam of high speed electrons from a General Electric Resonant Transformer operating at a beam current of 1 milliampere and 1 m.e.v. for a total dose in megarads as stated in the following table. The irradiated latex aws mixed with ammonium acrylate in amounts as stated in the table, based on the weight of the copolymer in the latex, and was graft copolymerized employing procedure similar to that employed in Example 1. A film of the graft copolymer latex was painted onto 22 gauge bonderized steel panels of about 4 x 12 inches and these were air dried about 2 hours, then baked for 30 min. at 300° F. then were removed and allowed to cool to room temperature. The coated panels were used to determine the impact strength of the film. The impact strength was determined by means of standard procedures using a Gardner Variable Impact Tester. Table 1 identifies the experiments and gives the proportions of ammonium acrylate employed in making the graft copolymer coating. The table gives the dose in megarads to which the copolymer was subjected and the impact in inch-pounds that the graft copolymer film withstood before cracking or breakage occurred.

TABLE 1

| Run No. | Ammonium Acrylate, percent | Radiation Dose, Megarads | Impact Strength, in.-lbs. |
|---|---|---|---|
| 1 | | | 14 |
| 2 | 2 | 2 | 28 |
| 3 | 2 | 5 | 30 |
| 4 | 8 | 1 | 30 |

*Example 3.*—In each of a series of experiments, a synthetic latex of a copolymer of 60 percent by weight of styrene and 40 percent of butadiene similar to that employed in Example 1 was irradiated with high speed electrons from a General Electric Resonant Transformer operating at a beam current of 1 milliampere and 1 m.e.v. for a total dose as stated in the following table. The irradiated latex was mixed with ammonium acrylate in amounts based on the weight of copolymer in the latex as stated in the table and was graft copolymerized onto the irradiated copolymer employing procedure similar to that employed in Example 1. A pigmented coating composition was prepared by mixing with the graft copolymer latex a ferric oxide pigment consisting of red iron oxide in a dispersion medium in amount corresponding to 100 parts by weight of the pigment per 100 parts by weight of the graft copolymer. The resulting coating composition was applied as a film to one side of a bonderized steel panel of No. 20 gauge and approximately 4 x 12 inches by means of a Meyer wire wound rod. This wire applicator was made by winding No. 16 gauge wire (.051" d.) on a rod of ¼" diameter. The coating was dried in air at room temperature for 2 hours, then was baked in an air oven at a temperature of 300° F. for a period of 30 minutes. After cooling to room temperature, the coating on the panel was immersed to about one-half of its length in a bath of water at a temperature of 95° F. for a period of 300 hours. Thereafter, the panel was removed from the water, was allowed to cool to room temperature and the coating was observed. Table II identifies the experiments and gives the proportions of ammonium acrylate employed in making the graft copolymer as well as the total dose of irradiation in megarads to which the latex was subjected. The table also gives the results of observations made on the coating after immersing in the hot water bath.

TABLE II

| Run No. | Ammonium Acrylate, percent | Radiation Dose, Megarads | Coating and Remarks |
|---|---|---|---|
| 1 | | | Poor adhesion. |
| 2 | 2 | 5 | Excellent adhesion. |
| 3 | 4 | 5 | Do. |
| 4 | 6 | 5 | Do. |
| 5 | 8 | 5 | Do. |
| 6 | 2 | 1 | Good adhesion, no peeling. |
| 7 | 2 | 2 | Excellent, no peeling. |
| 8 | 2 | 5 | Do. |
| 9 | 2 | 3 | Excellent, no peeling. |
| 10 | 0.2 | 3 | Fair adhesion, acceptable. |
| 11 | 0.02 | 3 | Poor adhesion, better than blank (Run No. 1). |

*Example 4.*—To a charge of a synthetic latex of a copolymer of 60 percent by weight of styrene and 40 percent of butadiene containing about 48 percent by weight of the copolymer there was added a charge of an aqueous 20 weight percent solution of ammonium methacrylate in amount corresponding to 6 percent by weight of the ammonium methacrylate based on the weight of the copolymer. The resulting mixture was placed under a beam of high speed electrons from a vations made on the panels after approximately 300 hours in a water bath at a temperature of 95° F.

TABLE III

| Run No. | Monomer | Percent | Appearance of Coating |
|---|---|---|---|
| 1 | Ammonium acrylate | 1 | Good adhesion, no rust. |
| 2 | ----do---- | 2 | Excellent adhesion, no rust. |
| 3 | ----do---- | 4 | Do. |
| 4 | ----do---- | 6 | Do. |
| 5 | ----do---- | 12 | Poor adhesion, rusted. |
| 6 | Ammonium methacrylate | 1 | Good adhesion, no rust. |
| 7 | ----do---- | 2 | Excellent adhesion, no rust. |
| 8 | ----do---- | 4 | Do. |
| 9 | ----do---- | 6 | Do. |
| 10 | ----do---- | 12 | Poor adhesion, rusted. |
| 11 | None | | Do. |

General Electric Resonant Transformer operating at a beam current of 1 milliampere and 1 m.e.v. potential and was irradiated for a total dose of 2 megarads. The irradiated mixture was heated at a temperature of 50° C. for a period of 3 hours. The product was a graft copolymer latex containing the ammonium methacrylate graft copolymerized onto the styrene-butadiene copolymer.

To the graft copolymer latex there was added, based on the weight of the graft copolymer, 100 percent by weight of a ferric oxide pigment. The resulting pigmented coating composition was applied to bonderized steel test panels and was dried and baked for 30 minutes at a temperature of 300° F. The coatings were tested by immersing the coated panels in hot water at a temperature of 95° C. for a time of 300 hours, then removing the panels from the water and observing the coating. For purpose of comparison, a coating composition consisting of the styrene-butadiene latex pigment with the ferric oxide pigment was coated onto other test panels of bonderized steel and were dried, baked and tested in the same manner. The results were as follows:

Copolymer Coating:
  Severe fading.
  Rust spots and streaks.
  Poor adhesion.
Graft Copolymer Coating:
  No fading.
  No rusting.
  Good adhesion.

*Example 5.*—A synthetic latex containing approximately 45 percent by weight of a copolymer of 80 percent by weight of styrene and 20 percent by weight of butadiene was irradiated with high speed electrons from a General Electric Resonant Transformer operating at a beam current of 1 milliampere and 1 m.e.v. for a total dose of 2.5 megarads. To five samples of the irradiated latex was added, respectively, 1, 2, 4, 6, and 12 percent of ammonium acrylate, based on the weight of the copolymer present in the latex. To another five samples was added the same percentages, respectively, of ammonium methacrylate, based on the weight of the copolymer in the latex. Grafting was completed by allowing the mixtures to stand at room temperature for eight hours.

The resulting mixtures were pigmented by mixing with a red iron oxide dispersion and the resulting paint was applied to panels as in Example 3. These panels were baked for 30 minutes in an oven maintained at 300° F. and then cooled. Table III shows results of observations made on the panels after approximately 300 hours in a water bath at a temperature of 95° F.

*Example 6.*—In a manner similar to Example 5 the ammonium acrylate and methacrylate monomers are grafted to samples of a synthetic latex containing approximately 45 percent by weight of a copolymer of 25 percent by weight styrene and 75 percent by weight butadiene in amounts equivalent to those of Example 5. The irradiation, grafting, pigmenting, baking, and testing operations are the same as the preceding example. Results of observation on the panels are essentially those of Example 5.

We claim:
1. A composition comprising an aqueous dispersion of a graft copolymer consisting of from 0.2 to 10 percent by weight of an ammonium salt of an ethylenically unsaturated aliphatic carboxylic acid having the general formula:

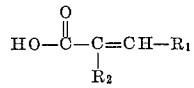

wherein $R_1$ and $R_2$ each represents a radical selected from the group consisting of hydrogen and alkyl radicals containing from 1 to 2 carbon atoms, polymerized in admixture with a synthetic latex containing a predominant amount by weight of a previously prepared copolymer of from 20 to 75 percent by weight of butadiene and from 80 to 25 percent of styrene which aqueous dispersion contains from about 20 to about 50 percent by weight of said graft copolymer.

2. A composition according to claim 1, wherein the monomer is ammonium acrylate.

3. A composition according to claim 1, wherein the monomer is ammonium methacrylate.

4. A composition according to claim 1, wherein the aqueous dispersion of the graft copolymer contains an inorganic pigment.

5. A composition according to claim 4 wherein the inorganic pigment comprises ferric oxide.

6. A composition comprising a homogeneous mixture of from 40 to 90 percent by weight of (1) an aqueous dispersion of a graft copolymer consisting of from 0.2 to 10 percent by weight of an ammonium salt of an ethylenically unsaturated aliphatic carboxylic acid having the general formula:

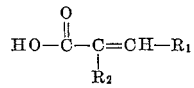

wherein $R_1$ and $R_2$ each represents a radical of the group consisting of hydrogen and alkyl radicals containing from 1 to 2 carbon atoms, polymerized in admixture with a synthetic latex containing a predominant amount by weight of a previously prepared copolymer of from 20 to 75 percent by weight of butadiene and from 80 to 25 percent of styrene, and (2) from 60 to 10 percent by weight of an aqueous dispersion of an inorganic pigment, said aqueous dispersion containing from 25 to 80 percent by weight of inorganic pigment.

7. A composition according to claim 6, wherein the monomer is ammonium acrylate.

8. A composition according to claim 6, wherein the monomer is ammonium methacrylate.

9. A composition according to claim 6 wherein the pigment comprises ferric oxide.

References Cited by the Examiner

UNITED STATES PATENTS

| | | | |
|---|---|---|---|
| 2,694,692 | 11/1954 | Amos et al. | 260—879 |
| 2,744,836 | 5/1956 | Schubert et al. | 260—29.6 |
| 2,858,281 | 10/1958 | Bauman et al. | 260—879 |

FOREIGN PATENTS 1,101,682  4/1955  France.

OTHER REFERENCES

Angier et al.: J. Polymer Science, vol. 28, pp. 265–274, 1958, (copy in Scientific Library).

Schildknecht: "Vinyl and Related Polymers," John Wiley and Sons, Inc., New York, 1952, (copy in Scientific Library, p. 299 relied on).

MURRAY TILLMAN, *Primary Examiner.*

DAN ARNOLD, LEON J. BERCOVITZ, WILLIAM H. SHORT, *Examiners.*

E. B. WOODRUFF, J. ZIEGLER, *Assistant Examiners.*